US007196330B2

(12) United States Patent
Noguchi

(10) Patent No.: US 7,196,330 B2
(45) Date of Patent: Mar. 27, 2007

(54) PASSIVE INFRARED SENSOR

(75) Inventor: Michinori Noguchi, Otsu (JP)

(73) Assignee: Optex Co., Ltd., Shiga (JP)

( * ) Notice: Subject to any disclaimer, the term of this patent is extended or adjusted under 35 U.S.C. 154(b) by 85 days.

(21) Appl. No.: 11/064,514

(22) Filed: Feb. 24, 2005

(65) Prior Publication Data

US 2005/0211899 A1 Sep. 29, 2005

(30) Foreign Application Priority Data

Feb. 27, 2004 (JP) ............................. 2004-054379

(51) Int. Cl.
*G01J 5/08* (2006.01)

(52) U.S. Cl. ....................................... 250/342; 250/353

(58) Field of Classification Search ................ 250/342, 250/353

See application file for complete search history.

(56) References Cited

U.S. PATENT DOCUMENTS 5,227,632 A * 7/1993 Armstrong et al. ......... 250/353
5,452,135 A * 9/1995 Maki et al. ................. 359/834
5,453,622 A * 9/1995 Sandell et al. .............. 250/353
5,703,368 A * 12/1997 Tomooka et al. ........... 250/349
6,414,314 B1 7/2002 Ikeda

FOREIGN PATENT DOCUMENTS

| | | |
|---|---|---|
| EP | 0421119 | 4/1991 |
| JP | 9-101376 | 4/1997 |
| JP | 09305871 | 11/1997 |
| JP | 2000-213985 | 8/2000 |

* cited by examiner

*Primary Examiner*—Albert Gagliardi
(74) *Attorney, Agent, or Firm*—Wenderoth, Lind & Ponack, L.L.P.

(57) ABSTRACT

According to one embodiment, a passive infrared sensor includes an infrared sensing element 4, a pair of lenses 5R and 5L that set mutually substantially 180° opposing side detection areas of the infrared sensing element 4, and mirrors 6R and 6L that cause infrared light from the side detection areas to enter the infrared sensing element 4. An infrared light incident surface of the passive infrared sensor is disposed facing the opposite direction from an attachment surface 30 to which the passive infrared sensor is attached at the time of installation, and the passive infrared sensor is also disposed with a lens 5C that sets plural front detection areas in the front direction. A slit 7 for allowing infrared light to be transmitted is formed in the mirrors 6R and 6L in order to allow the infrared light from the front detection areas to enter the infrared sensing element 4.

15 Claims, 5 Drawing Sheets

PASSIVE INFRARED SENSOR

CROSS-REFERENCE TO RELATED APPLICATION

This application claims the benefit of priority under 35 U.S.C.§119(a) from Patent Application No. 2004-54379 filed Feb. 27, 2004, in Japan, of which full contents are incorporated herein by reference.

BACKGROUND OF THE INVENTION

1. Field of Invention

The present invention relates to a passive infrared sensor that detects the presence of an intruder in a security area by receiving the infrared light that the intruder emits, and in particular to a passive infrared sensor that detects the presence of an intruder intruding through a wall, window, or doorway of a building.

2. Conventional Art

Conventionally, in this type of passive infrared sensor, the infrared light emitted from a human body is collected by optical components and received by an infrared sensing element, and the angular range (i.e., the detection area) in which the sensor can collect the infrared light when seen in plan view from above is usually divided into plural pairs comprising pairs of pluses and minuses and set. Among passive infrared sensors, there is a "wide sensor", which is used for the purpose of detecting the presence of an intruder intruding into a wide space such as the interior of a room, and a "narrow sensor", which is used for the purpose of detecting the presence of an intruder intruding through a window or door facing a narrow hallway. In the case of the wide sensor, numerous (e.g., 5 to 9 pairs) angular ranges of the detection areas are set in consideration of the purpose of use. In the case of the narrow sensor, a small number (e.g., 1 to 2 pairs) of angular ranges of the detection areas are set. Below, the number of one pair of detection areas will be represented by a number.

The detection distance of the narrow sensor is usually set to be longer (1.5 to 2 times larger) than the detection distance of the wide sensor in consideration of the purpose of use. For this reason, with respect to the longest distance (called "rated distance" below) from the position of the sensor at which the sensor can detect a detection target (intruder) to the detection target, the focal length of the lens of the narrow sensor is made longer in comparison to the case of the wide sensor so that the width of the detection target and the widths of the detection areas are the same. There are also cases where the focal length of the lens is left as is, and the rated distance is made longer by increasing the area of the lens (one type of optical component) per one detection area to increase the amount of received light.

However, when the focal length of the lens of the narrow sensor is made longer, the size of the sensor becomes larger, which results in the sensor being conspicuous when it is disposed in a building or the like. Not only is the security effect compromised as a result of the presence of the sensor becoming more easily known to an intruder, but the sense of incongruity of the building increases. On the other hand, when the area of the lens is increased, the width of the detection area becomes wider. Thus, when the movement of an intruder is slow, sometimes the detection thereof becomes difficult. Detection can be facilitated with the design of circuits or the like, but this gives rise to a new problem in that it becomes easier for misdetection resulting from a disturbance or the like to occur.

A passive infrared sensor that can set substantially 180° opposing detection areas with one sensor has been proposed (e.g., see Japanese Patent Application Laid-Open Publication (JP-A) No. 2000-213985; referred to below as "Patent Document 1"). This passive infrared sensor is disposed with an infrared sensing element, a pair of optical components that set mutually substantially 180° opposing detection areas of the infrared sensing element, and a pair of mirrors that cause infrared light from the detection areas to enter the infrared sensing element. According to this passive infrared sensor, the focal length of the optical components can be reduced to ½ that of the conventional format, whereby the size of the passive infrared sensor can be reduced. When the passive infrared sensor is disposed at an intermediate position in a security area, the wiring is also facilitated.

When a passive infrared sensor is disposed outdoors, sometimes misdetection occurs due to a heat source distant from the detection area, direct sunlight, or a small animal entering the detection area, but a passive infrared human body detection apparatus that can reliably prevent such misdetection and detect with high precision only human bodies has been proposed (e.g., see JP-A No. 9-101376; referred to below as "Patent Document 2").

This passive infrared human body detection apparatus comprises two sensor units, each of which includes a light receiving element that converts incident infrared energy into an electrical signal corresponding to the fluctuation amount of the incident infrared energy and an optical system that collects infrared light and causes the infrared light to be made incident at the light receiving element. The sensor units set predetermined detection areas with the light receiving directions of the optical systems, and change the infrared energy emitted from within the detection areas to electrical signals corresponding to the fluctuation amounts of the infrared energy. The first sensor unit is disposed so that its light receiving direction faces the upper half of a human body to be detected and so that its detection area does not reach the ground. The second sensor unit is disposed so that its detection area is below the detection area of the first sensor unit and faces the ground separated by a predetermined detection distance from the second sensor unit's own disposed position. The passive infrared human body detection apparatus is also disposed with level detection circuits, which output detection signals when the electrical signals outputted from the light receiving elements of both sensor units exceed a predetermined level, and a human body detection circuit, which outputs a human body detection signal when the detection signals have been outputted from both level detection circuits. It is also disclosed that, in this passive infrared human body detection apparatus, the detection distance can be made to conform to the size of the security area by adjusting the vertical orientation of the second sensor unit.

Also, with a wide sensor, numerous detection areas can be set in an angular range that is wide overall, but they remain at about 120° at a maximum due to restrictions such as the visual angle and the like of the infrared sensing element. For this reason, a wide sensor has not been able to completely cover, over 180°, a security area along a wall or window.

The above narrow sensors are suited for detecting the presence of an intruder intruding through a wall or window of a building, and there are also passive infrared sensors where the prior arts described in Patent Document 1 and Patent Document 2 are combined and used. The detection areas in this case are formed as shown in FIGS. 5(*a*) and 5(*b*), for example. Here, FIGS. 5(*a*) and 5(*b*) are schematic descriptive drawings of detection areas in an installation example of a passive infrared sensor 100. FIG. 5(*a*) is a plan view, and FIG. 5(*b*) is a front view. It will be noted that, because the detection areas are set to be bilaterally symmetrical around the disposed position of the passive infrared sensor 100, the detection areas at the right side of the passive infrared sensor 100 will be mainly described below.

As shown in FIGS. 5(*a*) and 5(*b*), the passive infrared sensor 100 is disposed at a position on a wall surface 50*a* at a height H (e.g., 0.8 to 1.2 m) from a ground 52 in the center of a narrow security area 51 along a wall 50. The passive infrared sensor 100 has two detection areas, an upper detection area and a lower detection area, each of which comprises one pair (+ or − will be added to reference numerals below) of divided areas in the horizontal direction. Upper detection areas 101+ and 101− are set facing the substantially horizontal direction from the passive infrared sensor 100. Lower detection areas 102+ and 102− are set facing slightly above the ground 52 at a position separated by a rated distance L1 from the passive infrared sensor 100. When these detection areas are seen in plan view, the detection areas 101+ and 102+ overlap, and the detection areas 101− and 102− similarly overlap. When the length of the security area 51 is short, e.g., when the distance from the passive infrared sensor 100 to the end of the security area 51 is a distance L2, the presence of an intruder in the security area 51 actually serving as the target can be more reliably detected by changing the lower detection areas 102+ and 102− so that they are set to face the vicinity of the ground 52 at a position of the distance L2 from the passive infrared sensor 100.

However, if the place in which the passive infrared sensor is to be disposed is a house, and both the windows and the vicinity of the gate are to be watched, or both the walls and the back door are to be watched, it is difficult for the passive infrared sensor 100 to detect the presence of an intruder approaching from the front because detection areas are not present in the front direction of the installation position. This type of purpose can be accommodated by combining and using a narrow sensor such as the passive infrared sensor 100 with a wide sensor that is for close range and has detection areas with a wide angular range. However, because it is necessary to dispose two passive infrared sensors, not only is the security effect compromised as a result of the presence of the sensor becoming more conspicuous, but the sense of incongruity of the building increases. Installations fees also become higher, and the wiring and the like becomes complicated.

SUMMARY OF THE INVENTION

In view of the problems in the prior art, it is an object of the present invention to provide a passive infrared sensor that can enlarge, with a simple configuration, the security target area to substantially 180° to raise crime preventability by adding, in addition to the function of a narrow sensor that watches both side directions as far as a long distance region, the function of a wide sensor that can watch a close distance region in the front direction in a wide angular range.

In order to achieve this object, one aspect of the invention provides a passive infrared sensor including: an infrared sensing element; a pair of first optical components that set mutually substantially 180° opposing side detection areas of the infrared sensing element; and a pair of mirrors that cause infrared light from the side detection areas to enter the infrared sensing element, wherein the infrared sensing element has an infrared light incident surface that faces a front direction of the passive infrared sensor in an opposite direction from an attachment surface to which the passive infrared sensor is attached at the time of installation, the passive infrared sensor further includes a second optical component that sets plural front detection areas in the front direction, and at least one infrared transmitting portion that allows infrared light to be transmitted therethrough is formed in the pair of mirrors in order to allow infrared light from the front detection areas to enter the infrared sensing element.

Here, the passive infrared sensor may be a passive infrared sensor whose target is a security area along a wall or window, but the passive infrared sensor is not limited to this. The infrared transmitting portion may be a slit, but the infrared transmitting portion is not limited to this.

According to the passive infrared sensor of this aspect of the invention, the presence of an intruder can be detected in regard to both side directions of the passive infrared sensor. Moreover, the presence of an intruder can be detected in a wide angular range also in regard to the front direction of the passive infrared sensor. Thus, because the presence of the intruder can be detected substantially 180° in all directions, crime preventability can be raised.

In order to achieve the above object, another aspect of the invention provides a passive infrared sensor including a first infrared sensing system and a second infrared sensing system, each of which includes: an infrared sensing element; a pair of first optical components that set mutually substantially 180° opposing side detection areas of the infrared sensing element; and a pair of mirrors that cause infrared light from the side detection areas to enter the infrared sensing element, with the first infrared sensing system setting detection areas in a substantially horizontal direction and the second infrared sensing system setting detection areas below the detection areas set by the first infrared sensing system, wherein in the first infrared sensing system, the infrared sensing element has an infrared light incident surface that faces a front direction of the passive infrared sensor in an opposite direction from an attachment surface to which the passive infrared sensor is attached at the time of installation, the first infrared sensing system further includes a second optical component that sets plural front detection areas in the front direction, and at least one infrared transmitting portion that allows infrared light to be transmitted therethrough is formed in the pair of mirrors in order to allow infrared light from the front detection areas to enter the infrared sensing element, and in the second infrared sensing system, the infrared sensing element has an infrared light incident surface that faces a front direction of the passive infrared sensor in an opposite direction from an attachment surface to which the passive infrared sensor is attached at the time of installation, the second infrared sensing system further includes a second optical component that sets plural front detection areas in the front direction, and at least one infrared transmitting portion that allows infrared light to be transmitted therethrough is formed in the pair of mirrors in order to allow infrared light from the front detection areas to enter the infrared sensing element.

According to the passive infrared sensor of this aspect of the invention, the presence of an intruder can be detected in regard to both side directions of the passive infrared sensor in both of the first infrared sensing system and the second infrared sensing system. Moreover, the presence of an intruder can be detected in a wide angular range also in regard to the front direction of the passive infrared sensor. Thus, because the presence of the intruder can be detected substantially 180° in all directions, crime preventability can be raised. Also, because the detection areas are present above and below, only a target having a determinate height can be detected.

The passive infrared sensor of the invention may be configured so that sensing signals are outputted when the first infrared sensing system senses infrared light equal to or greater than a predetermined value and the second infrared sensing system senses infrared light equal to or greater than a predetermined value.

According to this passive infrared sensor of the invention, sensing signals can be outputted and watch can be conducted only when a target having a determinate height intrudes into the security area and infrared light equal to or greater than a predetermined value is sensed at the same time by the first infrared sensing system and the second infrared sensing system. Thus, false alarms can be reduced and the reliability of the passive infrared sensor can be raised in comparison to a case where sensing signals are outputted when infrared light equal to or greater than a predetermined value is sensed even by one of the first infrared sensing system and the second infrared sensing system.

In the passive infrared sensor of the invention, the second infrared sensing system may be configured so that a setting direction of the detection area is variable.

According to this passive infrared sensor of the invention, optimum detection areas can be set in accordance with the length of the security area. Thus, the presence of an intruder intruding into the security area actually serving as the target can be more reliably detected.

BRIEF DESCRIPTION OF THE DRAWINGS

FIG. 1(*b*) is a front view of the same.

FIG. 1(*c*) is a left side view of the same.

FIG. 1(*d*) is a right side view of the same.

FIG. 3(*b*) is a right side view of the same mirror unit.

FIG. 3(*c*) is a bottom view of the same mirror unit.

FIG. 4(*b*) is a front view describing the same detection areas.

FIG. 5(*b*) is a front view describing the same detection areas.

DESCRIPTION OF THE PREFERRED EMBODIMENT

An embodiment of the invention will be described below with reference to the drawings.

Figure 1A:
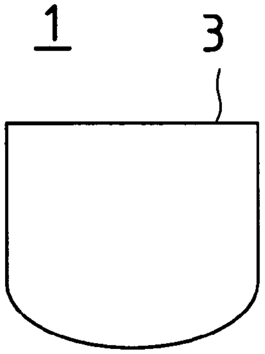
FIG. 1(*a*) is a plan view of the schematic configuration of a passive infrared sensor associated with an embodiment of the invention.
Figure 1C:
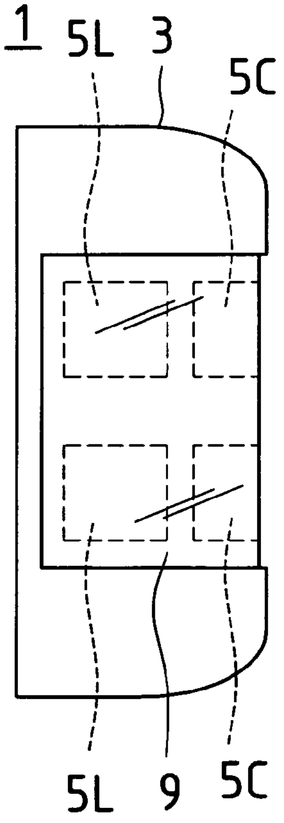
Figure 1B:
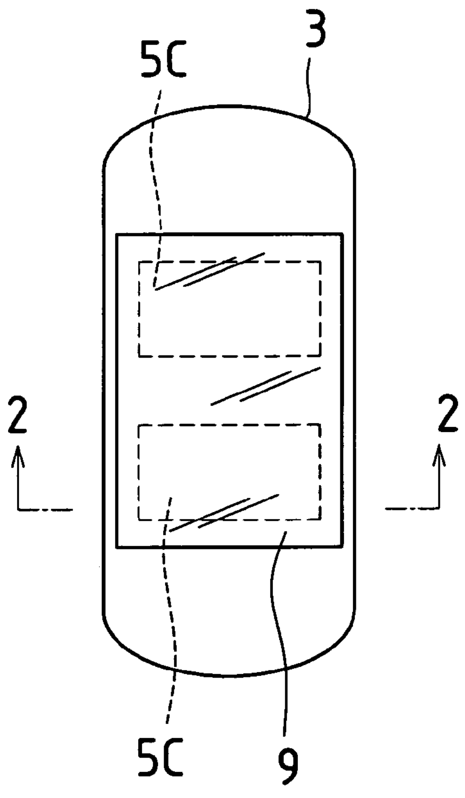
Figure 1D:
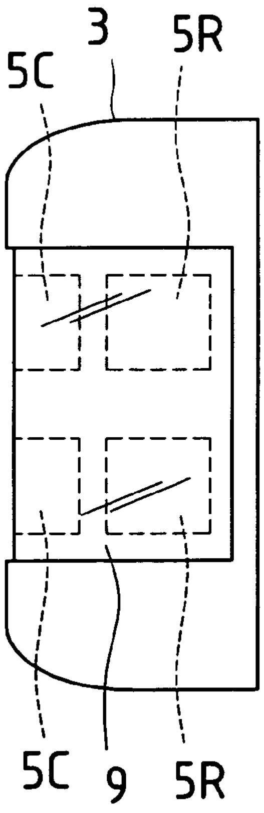
Figure 2:
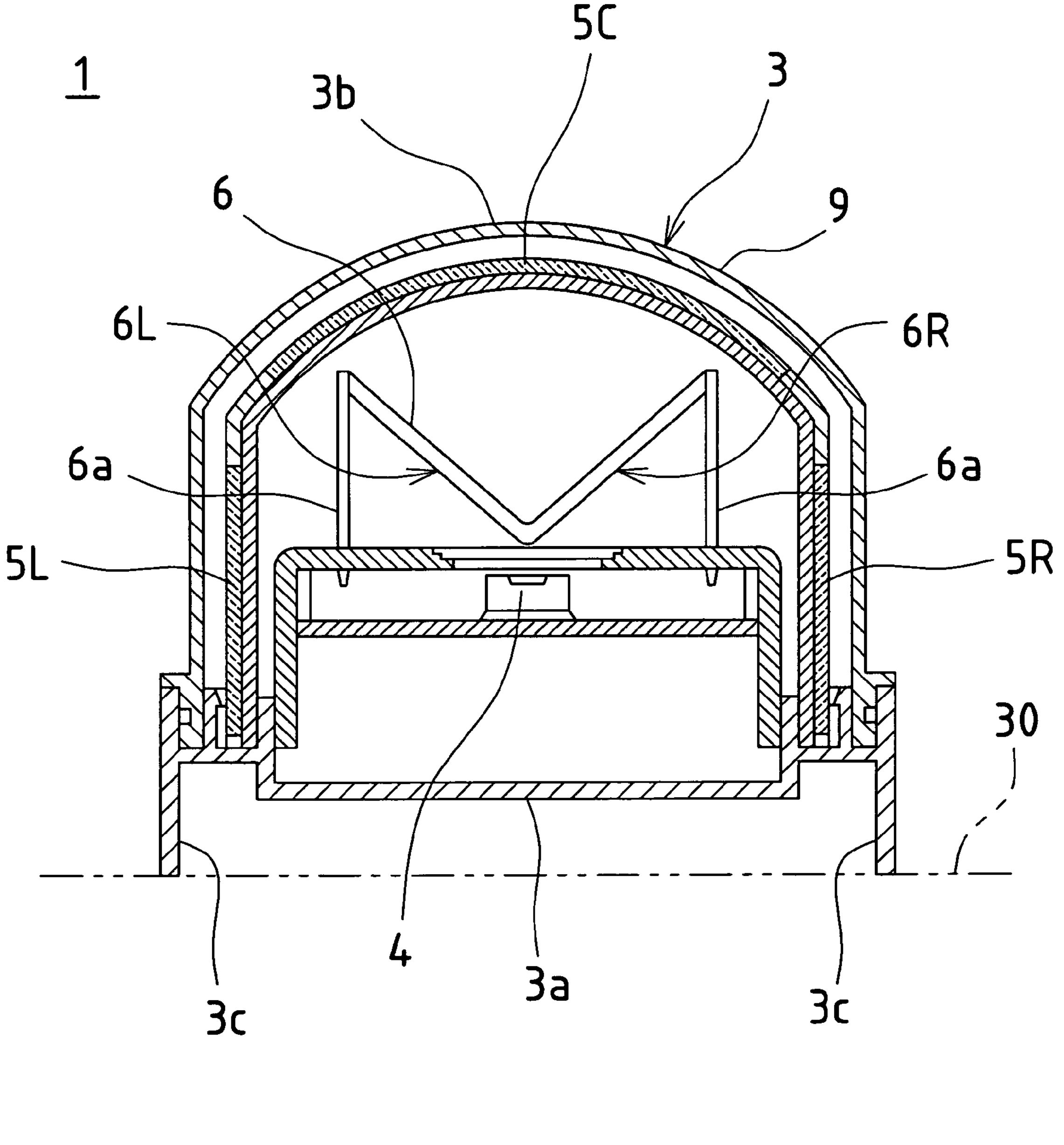
FIG. 2 is a cross-sectional view along line 2—2 of FIG. 1(*b*).

FIGS. 1(*a*) to 1(*d*) are schematic configural diagrams of a passive infrared sensor 1 associated with the embodiment of the invention. FIG. 1(*a*) is a plan view, FIG. 1(*b*) is a front view, FIG. 1(*c*) is a left side view, and FIG. 1(*d*) is a right side view. FIG. 2 is a cross-sectional view along line 2—2 of FIG. 1(*b*).

As shown in FIGS. 1(*a*) to 1(*d*) and FIG. 2, in the passive infrared sensor 1, two infrared sensing systems are disposed at an upper portion and a lower portion of a case 3. Each of the infrared sensing systems is disposed with one infrared sensing element 4, a pair of lenses 5R and 5L that set mutually substantially 180° opposing side detection areas in the side directions of the passive infrared sensor 1 when the infrared sensing element 4 is seen in plan view, and a mirror unit 6 that includes a pair of mirrors 6R and 6L that cause infrared light from the side detection areas to enter the infrared sensing element 4. Each of the infrared sensing systems is also disposed with a lens 5C that sets plural front detection areas covering a range of about 120° in the front direction of the passive infrared sensor 1 when the infrared sensing element 4 is seen in plan view. An unillustrated slit (described later with reference to FIGS. 3(*a*) to 3(*c*)) is formed in each mirror unit 6 to allow infrared light from each front detection area to enter the infrared sensing elements 4.

Of these, the lenses 5R, 5C and 5L are disposed at the inner side of a lens cover 9 that is fitted into a large open portion formed in the front surface of the case 3. The lenses 5R, 5C and 5L are fixed inside the case 3. It will be noted that although the lenses 5R, 5C and 5L are shown in FIG. 2 as being divided, the lenses are not limited to this configuration and may also be continuously configured. The portions other than the lenses 5R, 5C and 5L of the lower infrared sensing system are retained so as to be movable in a predetermined range in the vertical direction inside the case 3 by an unillustrated mechanism. Thus, because these portions' relative positional relationship with the lenses 5R and 5L can be changed, the setting directions of the side detection areas and the front detection area resulting from the lower infrared sensing system can be changed in a determinate range (from the substantially horizontal direction to diagonally downward). Attachment portions 3*c* are formed at both ends of a bottom portion 3*a* (at the side of an attachment surface 30) of the case 3, and the passive infrared sensor 1 is attached to a wall or the like with interposition of these attachment portions 3*c*.

The infrared sensing elements 4, which have incident surfaces facing the opposite direction from the attachment surface 30, are disposed in the upper portion and the lower portion of the case 3 at positions slightly nearer to the bottom portion 3*a* than the center of the case 3. Each mirror unit 6 is cross-sectionally M-shaped and includes the mirror 6R, which reflects infrared light from the right side direction of the passive infrared sensor 1 collected by the lens 5R and causes the infrared light to enter the infrared sensing element 4, the mirror 6L, which reflects infrared light from the left side direction of the passive infrared sensor 1 collected by the lens 5L and causes the infrared light to enter the infrared sensing element 4, and leg portions 6*a*, which respectively support the mirror 6R and the mirror 6L. The mirror units 6 are disposed between a top portion 3*b* of the case 3 and the infrared sensing elements 4. Each lens 5C disposed in the vicinity of the top portion 3*b* is a wide angle divided type lens, and causes infrared light from plural directions in the front of the passive infrared sensor 1 to enter the infrared sensing elements 4 through the slits formed in the mirror units 6.

Similar to the prior art described in Patent Document 1, each infrared sensing element 4 comprises a pair of rectangular elements (not shown) that correspond to the horizontally-arranged pair of divided detection areas through the lenses 5R, 5C and 5L. Both rectangular elements are configured to sense infrared light to obtain outputs of mutually opposite polarities. Thus, the detection sensitivity of the rectangular elements of the passive infrared sensor 1 is improved with respect to a detection target successively crossing the detection areas projected by the lenses 5R, 5C and 5L.

Usually, an infrared sensing element has the characteristic that its sensitivity is highest when a detection target with the same width as the widths of the pair of detection areas projected by the optical systems crosses both detection areas with a frequency of about 1 Hz. Thus, misdetection can be reduced with respect to slow frequency temperature changes of the surface of the passive infrared sensor due to wind or the like. Also, the sensing of infrared light resulting from a disturbance inputted at substantially the same time to the pair of detection areas, as with outside light that can cause misdetection by the passive infrared sensor, is offset by both rectangles.

Figure 3A:
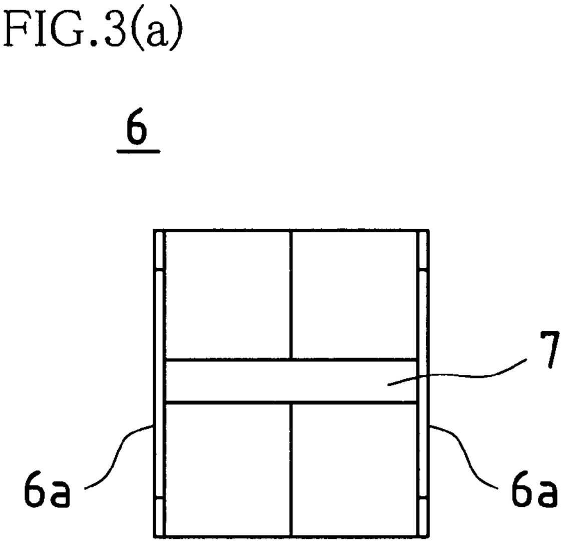
FIG. 3(*a*) is a front view of a mirror unit disposed at a lower side inside the passive infrared sensor associated with the embodiment of the invention.
Figure 3B:
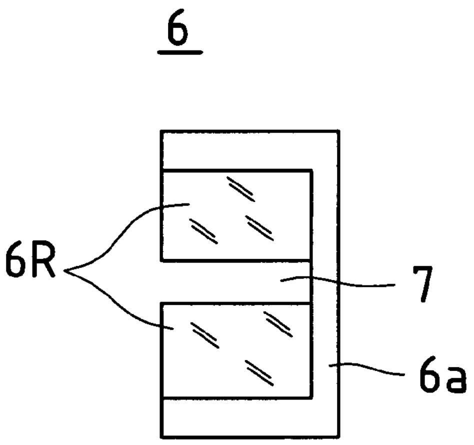
Figure 3C:
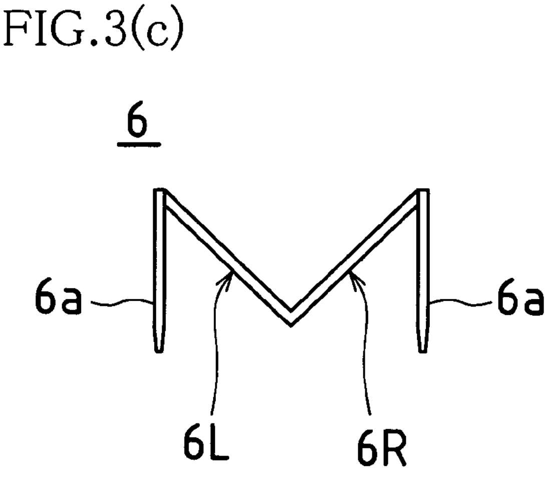

FIGS. 3(*a*) to 3(*c*) are three views of the mirror unit 6 disposed at the lower side inside the passive infrared sensor 1 associated with the embodiment of the invention. FIG. 3(*a*) is a front view, FIG. 3(*b*) is a right side view, and FIG. 3(*c*) is a bottom view. It will be noted that FIG. 3(*a*) is a view seen from the same direction as that of FIG. 1(*b*), FIG. 3(*b*) is a view seen from the same direction as that of FIG. 1(*d*), and FIG. 3(*c*) is a view seen from the same direction as that of FIG. 2.

As shown in FIGS. 3(*a*) to 3(*c*), a narrow, rectangular slit 7 is formed in the mirrors 6R and 6L of the mirror unit 6 so as to cross the center portion of the mirrors 6R and 6L. Because the area of the slit 7 determines the transmission amount of the infrared light, it is preferable for the area to be of an extent that can ensure the necessary detection distance as the front detection area of the passive infrared sensor 1. However, if the area of the slit 7 is increased beyond that which is necessary, the effective areas of the mirrors 6R and 6L are reduced, and there is the possibility for the detectable distances of the side detection areas to become short. Thus, this point requires care. It will be noted that the shape of the mirror unit 6 and the shape and position of the slit 7 are not limited to those shown in FIGS. 3(*a*) to 3(*c*). For example, each of the mirrors 6R and 6L may be divided into two mirrors, these may be combined to create two separate groups of mirror units shorter than the mirror unit 6, and these may be disposed with a clearance corresponding to the width of the slit 7 being disposed therebetween.

Also, because the leg portions 6*a* supporting the mirrors 6R and 6L are present between the mirrors 6R and 6L and the lenses corresponding to these mirrors, they block some of the infrared light from the side detection areas. Thus, it is preferable for the leg portions 6*a* to be configured to ensure the necessary strength and for the projection areas on the mirrors 6R and 6L to be as small as possible. Alternatively, the mirrors 6R and 6L may be set to be longer, and the leg portions may be disposed outside the optical paths of the infrared light.

Figure 4A:
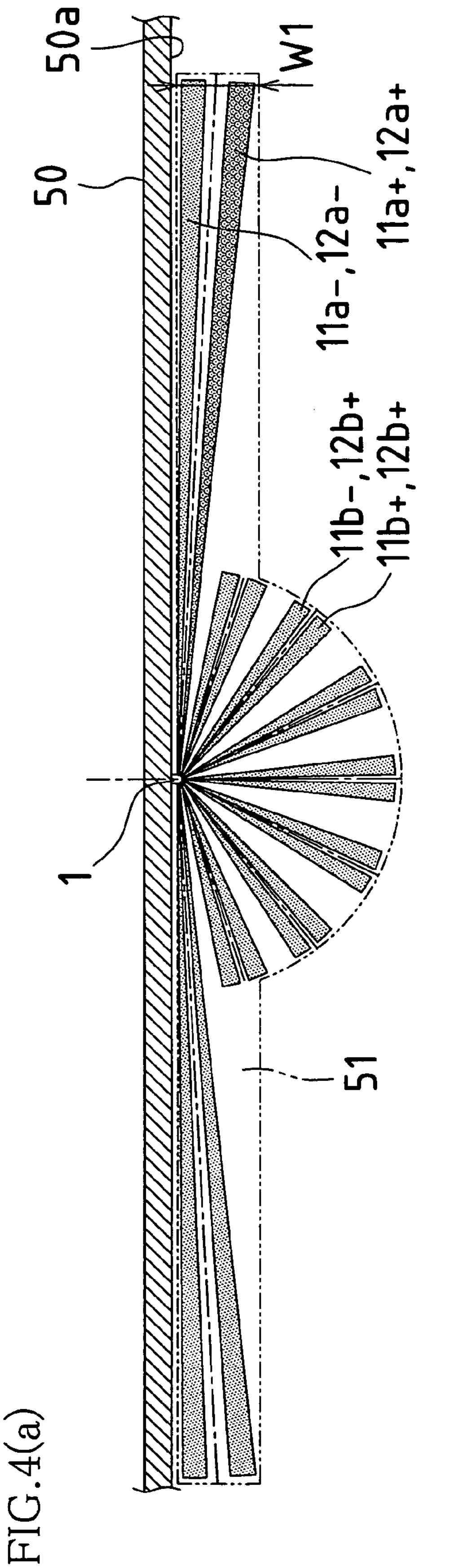
FIG. 4(*a*) is a plan view describing detection areas in an installation example of the passive infrared sensor associated with the embodiment of the invention.
Figure 4B:
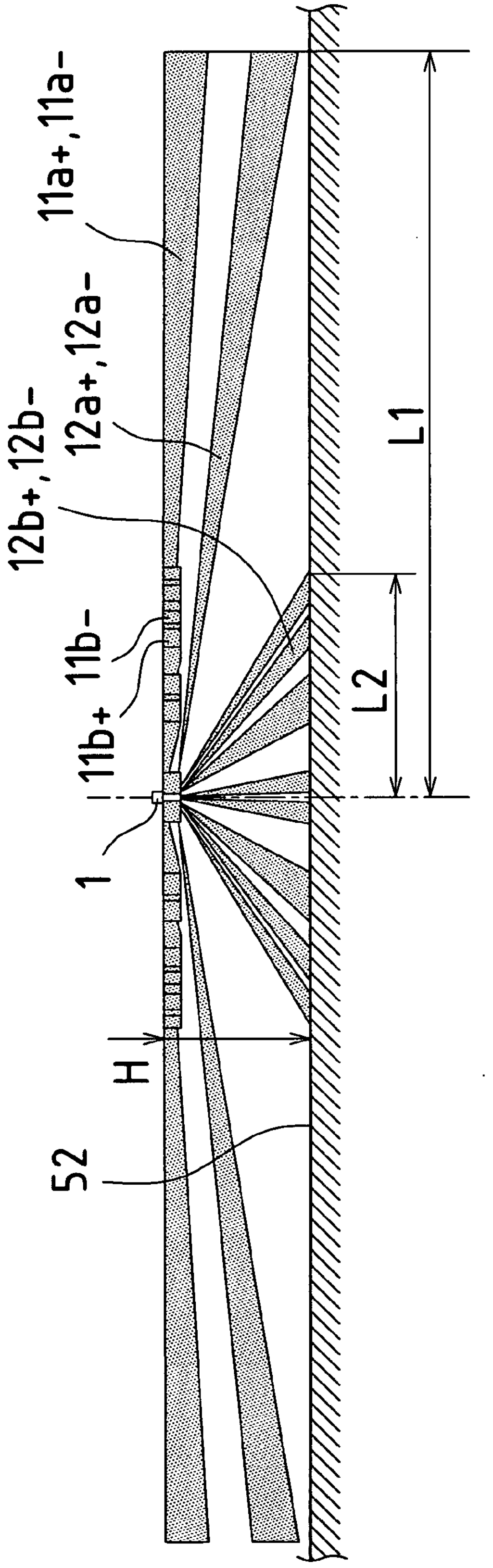

FIGS. 4(*a*) and 4(*b*) are schematic descriptive views of the side detection areas and the front detection area in an installation example of the passive infrared sensor 1 associated with the embodiment of the invention. FIG. 4(*a*) is a plan view, and FIG. 4(*b*) is a front view. It will be noted that, because the side detection areas are set to be bilaterally symmetrical around the disposed position of the passive infrared sensor 1, the right side detection areas and the front detection area of the passive infrared sensor 1 will be mainly described below.

Figure 5A:
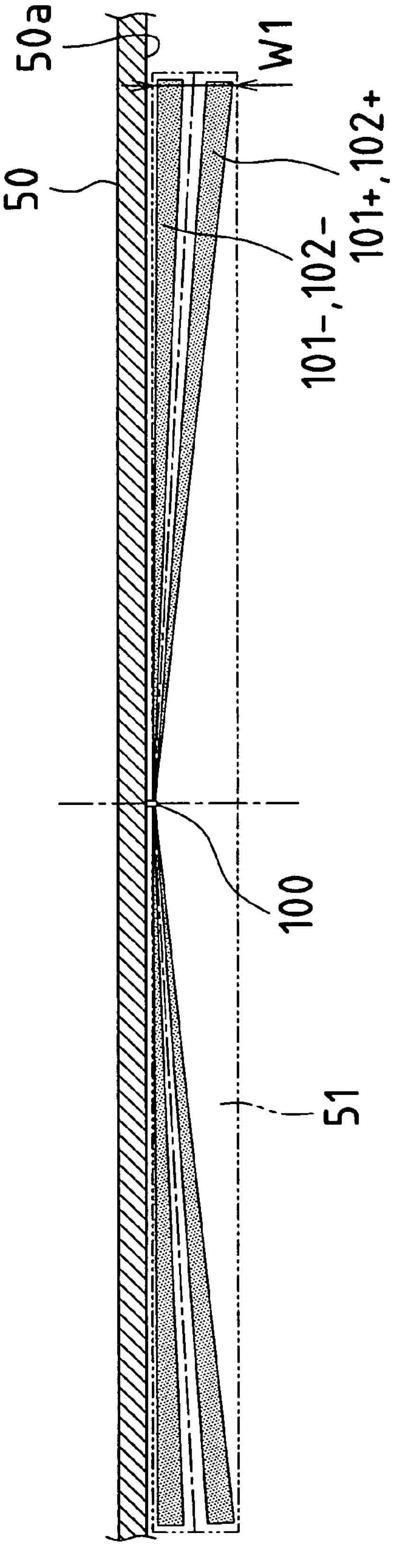
FIG.5(a) Conventional Art
FIG. 5(*a*) is a plan view describing detection areas in an installation example of a conventional passive infrared sensor.
Figure 5B:
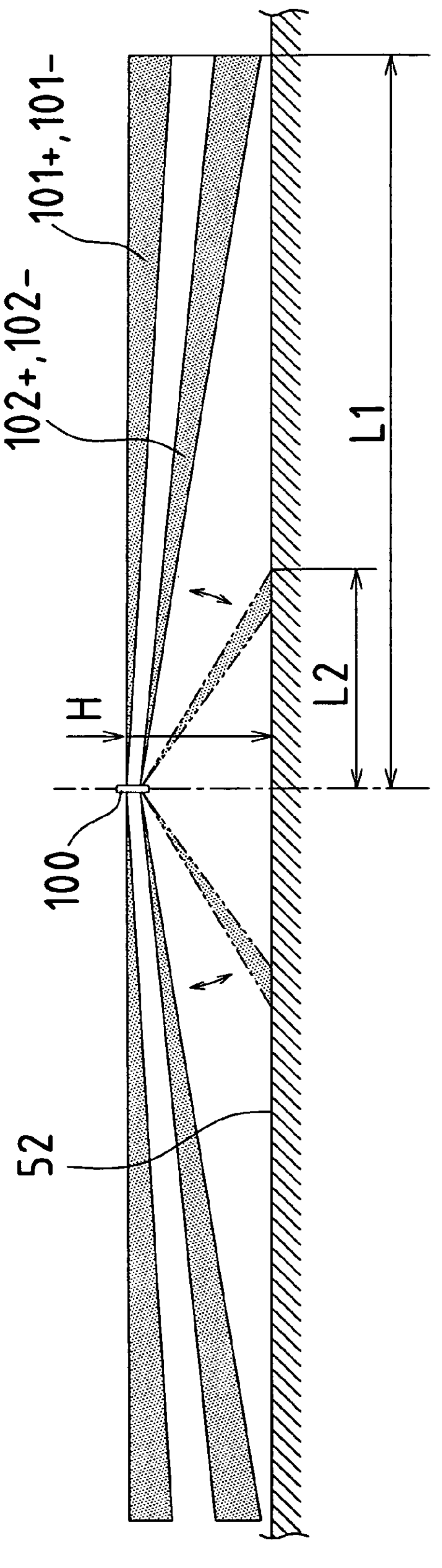
FIG.5(b) Conventional Art

As shown in FIGS. 5(*a*) and 5(*b*), the passive infrared sensor 1 is disposed at a position on a wall surface 50*a* at a height H from a ground 52 in the center of a security area 51 along a wall 50. Here, description will be given in a case where the length of the security area is 12 m and the rated distance L1 of the passive infrared sensor 1 is 6 m, but the invention is not limited to these values. Also, the height H is ordinarily set to about 0.8 m to about 1.2 m assuming a human as an intruder, but the invention is not limited to this. The height H at which the passive infrared sensor 1 is disposed may be changed in accordance with the size of the primary detection target.

Each of the side detection areas and the front detection area of the passive infrared sensor 1 includes an upper detection area and a lower detection area, each of which comprises one pair of divided areas in the horizontal direction. Upper side detection areas 11*a*+ and 11*a*− are set to face the substantially horizontal direction from the passive infrared sensor 1, and set substantially along the wall surface 50*a* in plan view. Lower side detection areas 12*a*+ and 12*a*− are set to face slightly above the ground 52 at a position separated by the rated distance L1 from the passive infrared sensor 1, and set substantially along the wall surface 50*a* in plan view. When seen in plan view, the upper side detection areas 11*a*+ and 11*a*− and the lower side detection areas 12*a*+ and 12*a*− respectively overlap.

Upper front detection areas 11*b*+ and 11*b*− are set to face the substantially horizontal direction from the passive infrared sensor 1, and lower front detection areas 12*b*+ and 12*b*− are set to face the vicinity of the ground 52 at a position separated by a relatively close distance L2 (e.g., 2 m) from the passive infrared sensor 1. When seen in plan view, each of the upper front detection areas 11*b*+ and 11*b*− and the lower front detection areas 12*b*+ and 12*b*-comprises seven detection areas that radiate outward around the passive infrared sensor 1. The divisional number of the front detection areas is determined by the lens 5C (see FIG. 2) but is not limited to seven.

Because the detection areas are disposed in this manner, the presence of an intruder can be detected as far as the rated distance L1 in regard to both side directions of the passive infrared sensor 1. Moreover, if an intruder is within the distance L2 from the passive infrared sensor 1, the presence of the intruder can be detected not only in both side directions but substantially 180° in all directions. Namely, a semicircular region of a radius L2 around the passive infrared sensor 1 is added to the rectangular region (whose length is two times the rated distance L1 and whose width is W1) along the wall 50 as the security area 51 of the passive infrared sensor.

Also, the passive infrared sensor 1 is configured to output detection signals and issue a warning only when the presence of an intruder is detected in both the upper and lower detection areas. Thus, misdetection is prevented as much as possible. The setting direction of the lower detection area is variable in a determinate range as described above. Thus, when the length of the security area 51 is short, for example, the setting direction of the lower detection area may be changed to face downward in accordance with the length of the security area 51, whereby the presence of an intruder in the security area 51 actually serving as a target can be more reliably detected.

Thus, if the area in which the passive infrared sensor 1 is to be disposed is a house, accommodation becomes possible with only one passive infrared sensor 1 when windows and the vicinity of the gate are to be watched or when both the windows and the backdoor are to be watched. Moreover, the passive infrared sensor 1 can be installed at virtually the same installation fee and with virtually the same wiring labor as a conventional narrow sensor, without the presence of the sensor becoming conspicuous and without the incongruity of the building increasing.

The invention can be implemented in various other ways without departing from the spirit or principal features thereof. Thus, the preceding embodiment has been provided only for the purpose of illustration and should not be construed as limiting the invention. It is intended that the scope of the invention be defined by the following claims and not limited to the body of the specification. All modifications and changes belonging to an equivalent scope of the invention are included in the scope of the invention.

What is claimed is:

1. A passive infrared sensor comprising:

a first infrared sensing system including:

a first infrared sensing element having an infrared light incident surface that faces a front direction of said passive infrared sensor, opposite to a direction toward an attachment surface to which said passive infrared sensor is intended to be attached upon installation, a first pair of first optical components that set mutually substantially 180 degree opposing side detection areas of said first infrared sensing element, a first pair of mirrors that cause infrared light from the side detection areas to enter said first infrared sensing element, and a second optical component of said first infrared sensing system that sets plural front detection areas in the front direction;

a second infrared sensing system including:

a second infrared sensing element having an infrared light incident surface that faces a front direction of said passive infrared sensor, opposite to a direction toward an attachment surface to which said passive infrared sensor is intended to be attached upon installation, a second pair of first optical components that set mutually substantially 180 degree opposing side detection areas of said second infrared sensing element, a second pair of mirrors that cause infrared light from the side detection areas to enter said second infrared sensing element, and a second optical component of said second infrared sensing system that sets plural front detection areas in the front direction;

wherein at least one infrared transmitting portion that allows infrared light to be transmitted there through is formed with said first and second pairs of mirrors in order to allow infrared light from the front detection areas to enter said first and second infrared sensing elements;

wherein said first infrared sensing system sets detection areas in a substantially horizontal direction and said second infrared sensing system sets detection areas below the detection areas set by said first infrared sensing system; wherein the side detection areas of said first and second pairs of first optical components have a first maximum detection distance that is longer than a second maximum detection distance of the front detection areas of the second optical components of said first and second infrared sensing systems; and wherein said at least one infrared transmitting portion is configured based on a necessary amount of infrared light to be transmitted through said infrared transmitting portion to ensure detection to the second maximum detection distance and based on the first maximum detection distance and the second maximum detection distance.

2. The passive infrared sensor of claim 1, wherein the first maximum detection distance is at least 1.5 times longer than the second maximum detection distance.

3. The passive infrared sensor of claim 1, wherein sensing signals are outputted when the first infrared sensing system senses infrared light equal to or greater than a predetermined value and the second infrared sensing system senses infrared light equal to or greater than a predetermined value.

4. The passive infrared sensor of claim 1, wherein the second infrared sensing system is configured so that a setting direction of the detection area is variable.

5. The passive infrared sensor of claim 4, wherein the infrared transmitting portion comprises a slit.

6. The passive infrared sensor of claim 4, wherein the passive infrared sensor is operable to set detection areas in an area along a sensor installation surface thereof.

7. The passive infrared sensor of claim 3, wherein the second infrared sensing system is configured so that a setting direction of the detection area is variable.

8. The passive infrared sensor of claim 1, wherein the infrared transmitting portion comprises a slit.

9. The passive infrared sensor of claim 3, wherein the infrared transmitting portion comprises a slit.

10. The passive infrared sensor of claim 1, wherein the passive infrared sensor is operable to set detection areas in an area along a sensor installation surface thereof.

11. The passive infrared sensor of claim 3, wherein the passive infrared sensor is operable to set detection areas in an area along a sensor installation surface thereof.

12. The passive infrared sensor of claim 7, wherein the infrared transmitting portion comprises a slit.

13. The passive infrared sensor of claim 7, wherein the passive infrared sensor is operable to set detection areas in an area along a sensor installation surface thereof.

14. The passive infrared sensor of claim 8, wherein the passive infrared sensor is operable to set detection areas in an area along a sensor installation surface thereof.

15. The passive infrared sensor of claim 9, wherein the passive infrared sensor is operable to set detection areas in an area along a sensor installation surface thereof.

* * * * *